United States Patent
Dulkin et al.

(10) Patent No.: US 9,860,249 B2
(45) Date of Patent: Jan. 2, 2018

(54) SYSTEM AND METHOD FOR SECURE PROXY-BASED AUTHENTICATION

(71) Applicant: CyberArk Software Ltd., Petach-Tivka (IL)

(72) Inventors: Andrey Dulkin, Herzelia (IL); Yair Sade, Herzelia (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 15/192,623

(22) Filed: Jun. 24, 2016

(65) Prior Publication Data

US 2016/0308868 A1    Oct. 20, 2016

Related U.S. Application Data

(63) Continuation of application No. 14/372,772, filed as application No. PCT/IL2013/050849 on Oct. 22, 2013, now abandoned.

(60) Provisional application No. 61/717,656, filed on Oct. 24, 2012.

(51) Int. Cl.
*H04L 29/06* (2006.01)
*G06F 21/31* (2013.01)

(52) U.S. Cl.
CPC .......... *H04L 63/0884* (2013.01); *G06F 21/31* (2013.01); *H04L 63/0281* (2013.01); *H04L 63/08* (2013.01); *H04L 63/10* (2013.01)

(58) Field of Classification Search
CPC . H04L 63/0884; H04L 63/0281; H04L 63/08; H04L 63/10; G06F 21/31

USPC .......................................................... 726/4
See application file for complete search history.

(56) References Cited

U.S. PATENT DOCUMENTS

| | | | | |
|---|---|---|---|---|
| 2003/0061512 | A1* | 3/2003 | Flurry | H04L 63/0815 726/4 |
| 2005/0015490 | A1* | 1/2005 | Saare | H04L 63/0815 709/225 |
| 2008/0077809 | A1* | 3/2008 | Hayler | G06F 12/1466 713/193 |
| 2010/0199086 | A1* | 8/2010 | Kuang | H04L 63/0869 713/155 |
| 2015/0215128 | A1* | 7/2015 | Pal | H04L 9/3228 713/155 |

* cited by examiner

*Primary Examiner* — Michael S McNally
(74) *Attorney, Agent, or Firm* — Finnegan, Henderson, Farabow, Garrett & Dunner LLP

(57) ABSTRACT

A system and method for secure authentication facilitates improving the security of authentication between a client and a target by using an innovative authentication module on a proxy. The client can connect to the proxy using a native protocol and provides client credentials to the proxy. The proxy uses an authentication module to authenticate the client and then to provide target access credentials for proxy-target authentication, thereby giving the client access to the target through the proxy. The invention facilitates connection between the client and the target without requiring the client to be in possession of the target access credentials. The proxy can optionally be connected to a privileged access management system which can provide and/or store target access credentials. Proxy-provided target access credentials facilitate preventing a client security breech from exposing target access credentials.

25 Claims, 5 Drawing Sheets

SYSTEM AND METHOD FOR SECURE PROXY-BASED AUTHENTICATION

CROSS-REFERENCE TO RELATED APPLICATIONS

This application claims the benefit of U.S. patent application Ser. No. 14/372,772, filed Jul. 17, 2014, which in turn claims the benefit of PCT Application No. PCT/IL2013/050849, filed Oct. 22, 2013, which in turn claims the benefit of U.S. Provisional Patent Application No. 61/717,656, filed Oct. 24, 2012, each of which is hereby incorporated by reference in its entirety.

FIELD OF THE INVENTION

The present invention generally relates to authentication, and in particular, it concerns secure proxy-based authentication.

BACKGROUND OF THE INVENTION

Authentication is the process of verifying the identity of a person or application. Authentication in computer systems can be done in various ways and involves acquiring user or application characteristics or credentials and verifying them against a known value. In popular conventional authentication implementations, a user, which can be a person or an application, requesting a connection to a target will interact with a client (machine) which then provides client credentials to the target. Typically, the target is a server machine or server process providing a service to the client. Typically, direct connection is made to the target via a native protocol. The target (or server) can be implemented either in hardware or by software. Upon receiving the client credentials, the target will authenticate the provided client credentials by comparing them with known values in order to verify the client and accordingly authorize (grant or deny) the request for connection. In this conventional authentication process, security breaches can occur at the client, at the target and in the transfer of client credentials between the client and the target (during communications).

Various systems involving proxies attempt to address security issues in the aforementioned authentication process: US2006/0101510 to Kadyk describes a method for negotiating a secure end-to-end connection between a client and a server where a proxy facilitates establishment of the end-to-end connection. In this method, a client initially establishes a secure connection to the proxy via which the client authenticates to the proxy. Once the client is authenticated to the proxy, the connection between the client and proxy is downgraded to an insecure connection. The proxy then facilitates establishment of a secure (encrypted) end-to-end connection between the client and the server by forwarding a client system request to the server. The secure end-to-end connection is encapsulated within the insecure client-proxy connection. This method prevents client credentials from being exposed in the client-proxy communications link and allows the client to communicate with the target without the proxy being aware of the communications (the end-to-end connection is secured). Kadyk thereby teaches an end-to-end connection between the client and the server wherein a conventional proxy forwards communications between client and server.

EP1157344 to Hudson describes a proxy server including a database. The proxy uses the database to augment a client request by adding user profile information from the database to the received client request. The proxy then sends the augmented client request, including client credentials, to the server for authentication. Hudson thereby teaches transfer of client requests including client credentials by a proxy wherein the original client request including the original client credentials are augmented by the proxy. There also exist other native protocol systems for filtering connections or adding information at a proxy. However, such systems do not address the security issues described in this document.

US2006/0225132 to Swift describes a method of controlling access to network services where an authorized proxy can access a service on behalf of a user. In this method, only authorized proxies can access services. Swift thereby teaches access limitation to a server whereby only authorized conventional proxies can access network services.

US2011/0231651 to Bollay describes establishment of an encrypted session between a client and a proxy facilitating access to a target. The address of the target server is only provided to the client once an encrypted client-proxy session is established. Bollay thereby teaches restricting communication of a target server address wherein communication of the target server address is only through encrypted client-proxy sessions.

Conventional use of proxies for authentication of a client to a target means that the client connects to the proxy via a special protocol of the application on the proxy providing the connection. This means that the client needs to change, for example, scripts, procedures, applications, etc. on the client in order to use the protocol of the proxy application.

Generally, in conventional authentication techniques, the authentication credentials are held by the client and are sent to the target for authentication. Requiring the client to have credentials that will allow the client to authenticate directly with the target means that if the client is compromised (hacked, breached), the client credentials can be hijacked and abused, providing access to the target. This risk is manifested by the existence of a variety of attack tools that directly focus on credentials, including keyloggers that can capture typed passwords, memory grabbers that can retrieve passwords from machine memory and many others.

Another security concern is due to the limitations of human users. Human users choose relatively simple, easy-to-remember passwords and often use the same password for different needs. Thus, conventional authentication systems and methods using password-based credentials can be vulnerable to security threats due to low password complexity and password reuse.

Furthermore, in the context of shared or privileged accounts, for example, when the same account is used by a group of administrators, conventional authentication systems are unable to link actions on a target to an individual user. In other words, when a common access credential (such as user/password) is used by group of users, there is no attribution on the target for which user is using the credentials/performing actions on the target machine.

Some systems attempt to address security issues by only allowing authorized clients (e.g. US2011/0231651 to Bollay) or authorized proxies (e.g. US2006/0225132 to Swift) access to a target. Other solutions attempt to improve security by using a proxy to establish a secure end-to-end connection between a client and a server. However, these solutions do not address the security issue of the client possessing credentials that provide direct access to the target.

Other systems attempt to address issues of security, shared accounts, credentials replacement and monitoring by installation of a central system, such as a proxy, which can be a 'jump server', through which a client establishes sessions with a target. The client connects to the proxy either through a terminal or through a browser-based interface. The proxy then establishes a native session with the target, using client credentials. Proxy systems are typically more complex to implement than conventional systems, including additional challenges such as using non-native protocols for client-proxy communications.

There is, therefore, a need for a system and method for securely authenticating a client to a target, without target access credentials being exposed and available on the client machine. Furthermore, there is a need for secure authentication of a client to a target whilst retaining the client access method.

SUMMARY

According to the teachings of the present embodiment there is provided a method of authentication including the steps of: receiving at a proxy an access request, wherein the receiving is via a protocol and the access request includes client credentials associated with a user; providing target access credentials, wherein the providing is based on the access request, the client credentials, and target authentication information; and sending via the protocol the target access credentials to a target; wherein the target access credentials are other than the client credentials.

In an optional embodiment, the receiving is from a client.

In an optional embodiment, the providing is contingent on successfully verifying the user based on the client credentials.

In an optional embodiment, the client credentials are selected from the group consisting of: a null set; and inherent client credentials.

In an optional embodiment, the providing of the target access credentials is based on one or more communication features selected from the group including: communication content; access request time, client identity, target identity, user identity; access request time; communication time; communication protocol; communication settings; and combinations of the communication features.

In an optional embodiment, the target authentication information is provided by: a database; or an algorithm; or a privileged access management system (PAMS).

In an optional embodiment, a privileged access management solution (PAMS) performs one or more steps selected from the group consisting of authenticating the client credentials; providing the target access credentials; storing monitoring information; storing analysis information; monitoring client communications from the client to the target; and monitoring target communications from the target to the client.

In an optional embodiment, the method further includes the step of: if the target successfully verifies the target access credentials then authorizing communications between the client and the target via the proxy.

In an optional embodiment the method further includes: if the target successfully verifies the target access credentials then the proxy transferring client communications from the client to the target and transferring target communications from the target to the client.

In another optional embodiment, the method further includes at least one-step selected from the group consisting of: monitoring the client communications and the target communications; recording the client communications and the target communications.

In another optional embodiment, the monitoring and the recording are of one or more communication features selected from the group consisting of: a communication content; a target identity; a client identity; a user identity; a communication time; communication protocol; and communication metadata.

In another optional embodiment, the method further includes the step of upon detecting a suspicious activity, initiating an alert.

In another optional embodiment, the method further includes the step of upon receiving an alert, terminating the transferring client communications and terminating the transferring target communications.

In another optional embodiment, the method further includes one or more steps selected from the group consisting of: interfering with the target communications; and interfering with the client communications.

In another optional embodiment, the interfering is selected from at least one of: deleting target communications; masking target communications; replacing target communications; deleting client communications; masking client communications; and replacing client communications.

In another optional embodiment, the interfering is by at least one of a white-list; a black-list; a replacement list; a client communication time; a client identity; a target identity; and a communication history.

In an optional embodiment, a form of the client credentials and a form of the target access credentials are each selected from the group consisting of username, password, access key, credential file, biometric identifier, gesture, selecting an image, physical token, certificates machine or device identifier, application identifier and combinations of forms of credentials.

According to the teachings of the present embodiment there is provided a system for authentication including: a proxy configured to: receive an access request, wherein the receiving is via a protocol and the access request includes client credentials associated with a user; provide target access credentials based on the access request, the client credentials and target authentication information; and send via the protocol the target access credentials to a target; wherein the target access credentials are other than the client credentials.

In an optional embodiment, the access request is received from a client.

In an optional embodiment, the system further includes a privileged access management solution (PAMS) configured to perform one or more functions selected from the group consisting of: authenticating the client credentials; providing the target access credentials; storing monitoring information; storing analysis information; monitoring client communications from the client to the target; and monitoring target communications from the target to the client.

In an optional embodiment, the system further includes an analysis module configured to initiate an alert based upon detecting a suspicious activity.

In an optional embodiment, the providing is contingent on successfully verifying the user based on the client credentials.

In an optional embodiment, the client credentials are selected from the group consisting of: a null set; and inherent client credentials.

In an optional embodiment, the providing of the target access credentials is based on one or more communication features selected from the group including: communication content; access request time, client identity, target identity, user identity; access request time; communication time;

communication protocol; communication settings; and combinations of the communication features.

In an optional embodiment, the target authentication information is provided by: a database; or an algorithm; or a privileged access management system (PAMS).

In an optional embodiment, a privileged access management solution (PAMS) performs one or more steps selected from the group consisting of: authenticating the client credentials; providing the target access credentials; storing monitoring information; storing analysis information; monitoring client communications from the client to the target; and monitoring target communications from the target to the client.

In an optional embodiment, the system further including the step of if the target successfully verifies the target access credentials then authorizing communications between the client and the target via the proxy.

In an optional embodiment the system further includes: if the target successfully verifies the target access credentials then the proxy transferring client communications from the client to the target and transferring target communications from the target to the client.

In another optional embodiment, the system further includes at least one-step selected from the group consisting of: monitoring the client communications and the target communications; recording the client communications and the target communications.

In another optional embodiment, the monitoring and the recording are of one or more communication features selected from the group consisting of: a communication content; a target identity; a client identity; a user identity; a communication time; communication protocol; and communication metadata.

In another optional embodiment, the system further includes the step of: upon detecting a suspicious activity, initiating an alert.

In another optional embodiment, the system further includes the step of: upon receiving an alert, terminating the transferring client communications and terminating the transferring target communications.

In another optional embodiment, the system further includes one or more steps selected from the group consisting of: interfering with the target communications; and interfering with the client communications.

In another optional embodiment, the interfering is selected from at least one of: deleting target communications; masking target communications; replacing target communications; deleting client communications; masking client communications; and replacing client communications.

In another optional embodiment, the interfering is by at least one of: a white-list; a black-list; replacement list; a client communication time; a client identity; a target identity; and a communication history.

In an optional embodiment, a form of the client credentials and a form of the target access credentials are each selected from the group consisting of username, password, access key, credential file, biometric identifier, gesture, selecting an image, physical token, certificates machine or device identifier, application identifier and combinations of forms of credentials.

According to the teachings of the present embodiment there is provided a computer-readable storage medium having embedded thereon computer-readable code for authenticating, the computer-readable code including program code for: receiving at a proxy an access request, wherein the receiving is via a protocol and the access request includes client credentials associated with a user; providing target access credentials, wherein the providing is based on the access request, the client credentials, and target authentication information; and sending via the protocol the target access credentials to a target; wherein the target access credentials are other than the client credentials.

According to the teachings of the present embodiment there is provided a computer program that can be loaded onto a server connected through a network to a client computer, so that the server running the computer program constitutes a proxy in a system according to any one of the above claims.

According to the teachings of the present embodiment there is provided a computer program that can be loaded onto a computer connected through a network to a server, so that the computer running the computer program constitutes a client computer in a system according to any one of the above claims.

BRIEF DESCRIPTION OF FIGURES

The embodiment is herein described, by way of example only, with reference to the accompanying drawings, wherein.

DETAILED DESCRIPTION—FIGS. 1-7

Figure 1A:
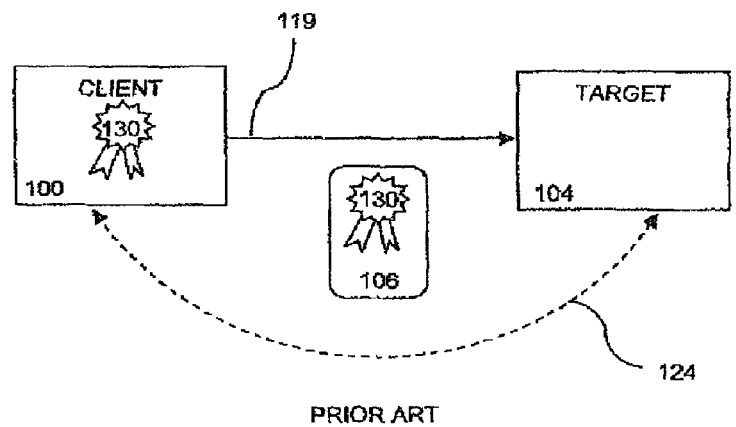
FIG. 1A is a schematic diagram of a conventional system of authentication, which does not include a proxy, wherein a client directly authenticates to a target.

The principles and operation of the system and method according to a present embodiment may be better understood with reference to the drawings and the accompanying description. A present invention is a system and method for secure authentication. The invention facilitates improving the security of authentication between a client and a target by using an innovative authentication module on a proxy. The client can connect to the proxy using a native protocol and provides client credentials to the proxy. The proxy uses an authentication module to authenticate the client and then to provide target access credentials for proxy-target authentication, thereby giving the client access to the target through the proxy. The invention facilitates connection between the client and the target without requiring the client to be in possession of the target access credentials. As will be described in more detail below, proxy-provided target access credentials facilitate preventing a client security breech from exposing target access credentials.

Credentials are provided (passed, sent, or transmitted) to an authentication element or module of a system and evaluated during an authentication process. The credentials are verified by the authentication module against data known to the authentication module and then, if the verification is successful the credentials are authenticated and the authentication module authorizes access to the element or system. While a popular form of credentials is username and password, forms of credentials also include access keys, credential files, gestures, biometrics, selecting an image, physical tokens, certificates, machine or device identifier, application identifier and other forms of credentials used for authentication, and combinations of forms of credentials as known in the art.

The term 'authentication' or 'authenticating' in the context of this document generally refers to the process of verifying the identity of a person or application. This process can include receiving credentials of the person or application, comparing them with known values, and accordingly verifying (successfully or unsuccessfully) the identity of the person or application.

The term 'authorization' or 'authorizing' in the context of this document generally refers to the process of granting or denying access or a level of access to a target system to a person or application that has been authenticated.

The term 'client credentials' in the context of this document generally refers to credentials possessed by the client which can be used to verify that a client is who the client claims to be. Client credentials can be used in authentication with another element or module of a system, for example in a direct authentication to a target or in authentication to a proxy.

The term 'target access credentials' or simply 'target credentials' in the context of this document generally refers to credentials for authentication to a target. Target credentials can be passed to the target by another element or module of a system, for example by a proxy or by a client.

In conventional authentication, where a client directly authenticates to a target, typically client credentials and target credentials are the same.

The term 'credentials', when used in general in this document, can refer to any credentials in the system, including client credentials and target credentials.

In the context of this document, the term 'user' is generally used to refer to a human who is interacting with a client, but can also refer to an application on the client machine, to a machine or device connected to the client machine (such as mobile or network device), and to a machine or device, such as a piece of hardware (where the hardware is acting as the user). One skilled in the art will realize from the context of the description in this document that the term "user" may also refer to an application on a client.

In the context of this document, the term 'client' or 'client machine' generally refers to the machine, device, or module used by a user (human, application, or machine). For example, an application (user) can reside on a client machine. Actions performed by a user are typically performed on the client (client machine). As will be obvious to one skilled in the art, the use of the general term 'client' refers to a portion of the system including the client machine and/or an associated user, user actions, and/or client processes The term 'client' when used in connection with actions or processes of the system can refer to user actions and/or client machine processes.

The term 'proxy' in the context of this document generally refers to a machine, module, application, or system that acts as an intermediary for requests between clients and target/s.

The term 'target' in the context of this document generally refers to a machine, module, application, or system that provides service to a client. Typically, a client desires connection with a target, and the client initiates connecting between the client and the target.

The term 'client communications' in the context of this document generally refers to communications originating at and from the client.

The term 'target communications' in the context of this document generally refers to communications originating at and from the target. For clarity in the current document, functionality of client, proxy and target are each shown on a separate machine. As is known in the art, alternative implementations are possible. For example, implementing one or more of the client, proxy, and target as configurable modules on one or more processing systems.

The term 'machine' in the context of this document is used for simplicity and clarity and should not be interpreted as limiting implementation of the current invention. As will be obvious to one skilled in the art, the term machine can include computers and computing systems (for example, physically separate locations or devices) and processors, processing systems, computing cores (for example, shared devices) and similar systems, modules, and combinations on which implementations can be instantiated. In general, a machine is an execution environment for computer software, including a physical or virtual hardware environment and an operating system.

In the context of this document the term 'link' is generally used to refer to a communications path between two elements/modules of the system e.g. a client-proxy link, a target-proxy link. Each link in a system can be physically the same or different. For simplicity in the current description, a link is generally between two modules over a network. For example, a link can be a TCP/IP connection. As will be known to one skilled in the art, each link in the system may use either common or different physical means of implementation, including, but not limited to TCP/IP sessions on the same network, physically separate computer networks, different types of network (for example, Ethernet or cellular), and common infrastructures with logical separation (for example, a common Ethernet network with more than one VLAN (virtual local area network) implementing the links).

In the context of this document 'logical communications link' is generally used to refer to a communications path over which information can flow between two elements/modules of the system formed by link's and/or element/s between them.

In the context of this document the terms 'communication' and 'communications' are generally used to refer to transfer of information. For example, between clients, proxies, and servers, including but not limited to commands, actions, transfer of data, etc.

In the context of this document, the term 'communication feature' is generally used to refer to a parameter or characteristic of a communication. Communication features include but are not limited to, communication content, target identity, client identity, user identity, access request time, communication time, communication protocol, and communication metadata. Communication content is the data content of the communication i.e. credentials (client or target), a command, an action, or data to be transferred. Target identity, client identity and user identity are data able to identify the target, client, or user associated with a communication, for example, the IP (Internet Protocol) address. Communication time can be the time of sending or time of receipt of the communication. Communication protocol is the protocol by which a communication is sent. Communication metadata includes parameters describing the communication, such as source IP, destination IP, source port, destination type of protocol being used, time etc.

In the context of this document, the term 'native protocol' is used to denote an existing conventional protocol that is used to communicate with a specific target. For example, a native protocol can be SSH (Secure Shell) protocol, which is commonly used to connect to UNIX machines. Many other protocols are known, whether public or proprietary, such as SQL (Structured Query Language), FTP (File Transfer Protocol), HTTP (Hypertext Transfer Protocol), HTTPS (Hypertext Transfer Protocol Secure), etc. Native protocols are generally level 4 (L4) of the OSI (Open Systems Interconnection) model, however they can be of an alternative level (e.g. HTTP).

For Windows servers, a common native protocol is RDP (Remote Desktop Protocol). It should be noted, that RDP is a special case of a native protocol, as it often serves as a non-native protocol as well, to connect to a jump-server or proxy (see below).

In networks that employ proxy or jump-server architecture, a non-native protocol is a protocol that is used for client to proxy communication, while the communication between the proxy and the target is done by a native protocol. Non-native protocols focus on transferring user commands to the proxy and commands are sent by the proxy to the target through the native protocol. Examples of non-native protocols are can be browser based interactive protocols including RDP, RFB (Remote Frame Buffer) protocol, Citrix protocol etc.

Referring now to the drawings, FIG. 1A is a schematic diagram of a conventional system of authentication, which does not include a proxy, wherein a client 100 directly authenticates to a target 104. Client 100 is in possession of client credentials 130. In this case, client credentials 130 also function as target access credentials. When client 100 wants to access target 104, client 100 sends an access request 106 to target 104 via client-target link 119 using a native protocol. Access request 106 includes client credentials 130. Target 104 receives access request 106 and performs authentication using client credentials 130. If client credentials 130 are verified and authentication is successful, target 104 authorizes establishment of a client-target logical communications link 124 between client 100 and target 104.

Figure 1B:
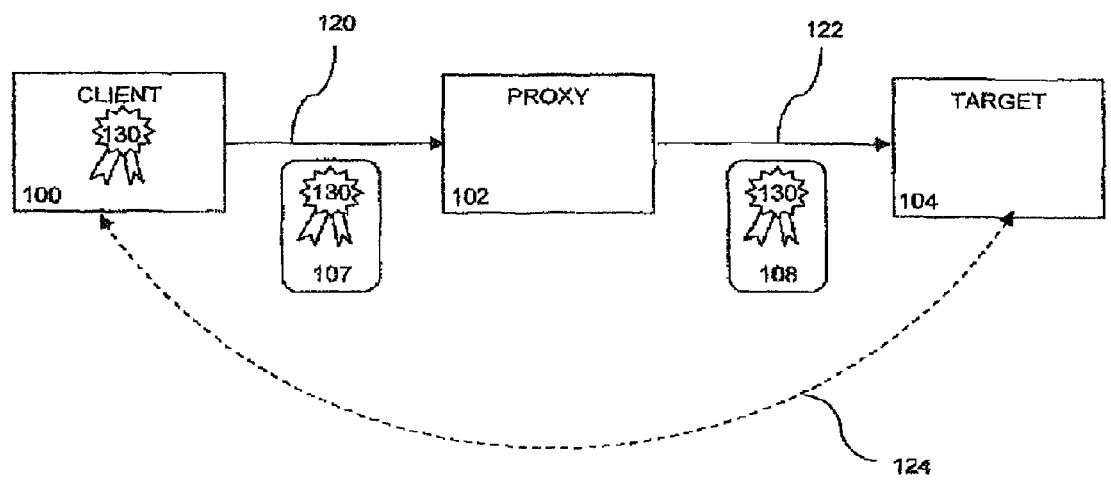
FIG. 1B is a schematic diagram of a conventional system of authentication including a proxy.

Referring to FIG. 1B, a schematic diagram of a conventional system of authentication including a proxy 102. Implementation of conventional proxies is known in the art, and includes products such as jump servers. A jump-server is a special purpose component or module generally used for managing devices in a separate security zone. As in the case of FIG. 1A, client credentials 130 function as both client credentials and target access credentials. Client 100 and target 104 communicate via proxy 102. Client 100 is in possession of client credentials 130. In a typical case, when client 100 wants to access target 104, client 100 sends a first access request 107 to proxy 102 via a client-proxy link 120 using a non-native protocol. First access request 107 includes client credentials 130. Proxy 102 then sends a second access request 108 using a native protocol to target 104 via a target-proxy link 122. Second access request 108 can be the same as first access request 107 or can be modified by proxy 102. In either case, a feature of conventional second access request 108 is the inclusion of client credentials 130. Target 104 receives second access request 108 and performs authentication using client credentials 130. If target 104 successfully verifies client credentials 130 and authentication is successful, target 104 authorizes establishment of a client-target logical communications link 124 between client 100 and target 104.

Figure 6:
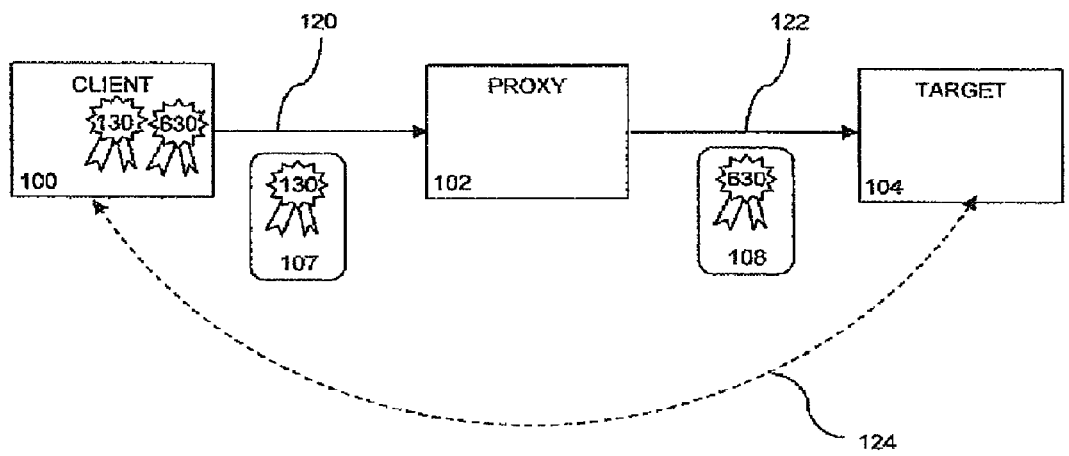
FIG. 6 is a schematic diagram of an another conventional system of authentication similar to that illustrated in FIG. 1B.

Referring to FIG. 6, a schematic diagram of another conventional system of authentication similar to that illustrated in FIG. 1B. In this system client 100 is in possession of a first client credentials 130 and a second client credentials 630. Client 100 uses first client credentials 130 to establish the client-proxy connection, and client 100 then transmits a second client credentials 630 to establish the connection between proxy 102 and target 104. In this case, both credentials 130 and 630 are sent from the client 100. The system illustrated by FIG. 6 can be implemented using, for example, systems offered by Citrix®.

Figure 5:
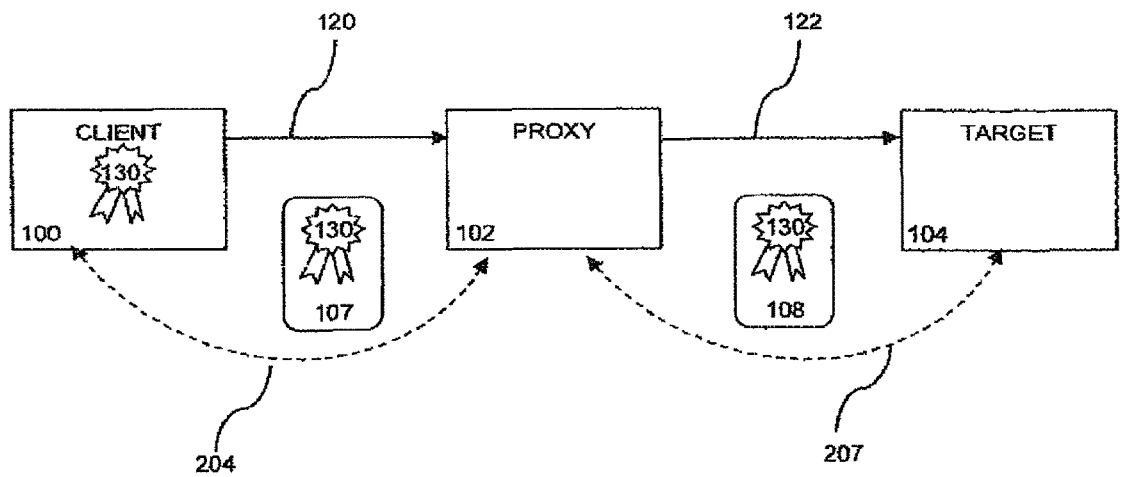
FIG. 5 is a schematic diagram of another conventional system of authentication including a proxy.

Referring to FIG. 5, a schematic diagram of another conventional system of authentication including a proxy 102. In this system, a client 100 sends requests to proxy 102 using a native protocol. Client credentials 130 function as both client credentials and target access credentials. Client 100 and target 104 communicate via proxy 102. Client 100 is in possession of client credentials 130. In a typical case, when client 100 wants to access target 104, client 100 sends a first access request 107 to proxy 102 via a client-proxy link 120 using a native protocol. First access request 107 includes client credentials 130. Proxy 102 then sends a second access request 108 using a native protocol to target 104 via a target-proxy link 122. Second access request 108 can be the same as first access request 107 or can be modified by proxy 102. In either case, a feature of conventional second access request 108 is the inclusion of client credentials 130. Target 104 receives second access request 108 and performs authentication using client credentials 130. If target 104 successfully verifies client credentials 130 and authentication is successful, target 104 authorizes second access request 108 and communications between client 100 and target 104 are established via proxy 102. Communications between client 100 and target 104 are via two links: a proxy-client native protocol logical communications link 204 and a proxy-target native protocol logical communications link 207.

Figure 7:
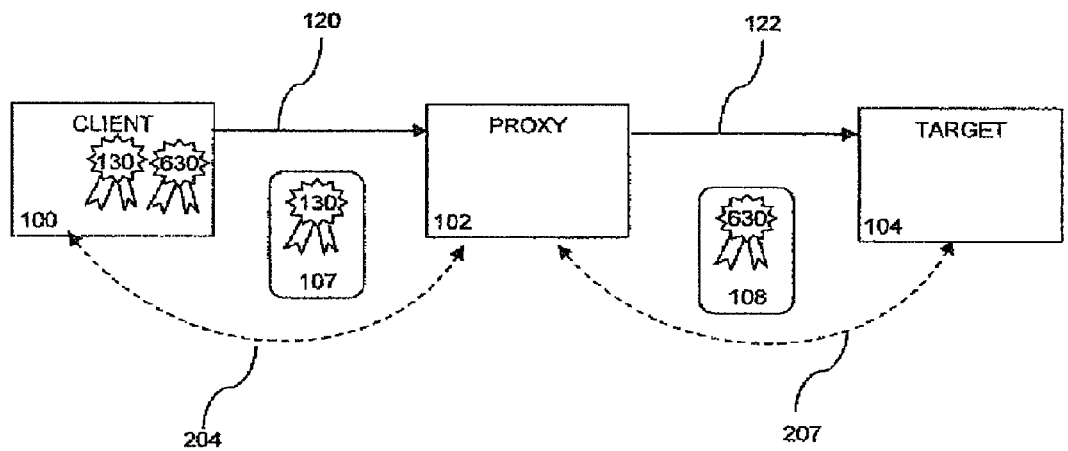
FIG. 7 is a schematic diagram of an another conventional system of authentication similar to that illustrated in FIG. 5

Referring to FIG. 7, a schematic diagram of another conventional system of authentication similar to that illustrated in FIG. 5. In this system client 100 is in possession of a first client credentials 130 and a second client credentials 630. Client 100 uses first client credentials 130 to establish the client-proxy connection, and client 100 then transmits a second client credentials 630 to establish the connection between proxy 102 and target 104. In this case, both credentials 130 and 630 are sent from the client 100.

Existing conventional systems of client authentication, including the systems illustrated in FIG. 1A, FIG. 1B, and FIG. 5 have a number of security issues:

In both the conventional systems of FIG. 1A, FIG. 1B, FIG. 5, FIG. 6, and FIG. 7 the client is in possession of target access credentials, whether they are the same as client credentials used to communicate to the proxy or a separate set of credentials, and therefore the client can access the target. If the client is compromised (hacked, breached), the target access credentials can be hijacked and abused, providing access to the target system. For example, an attacker can use software that captures keystrokes for hijacking username/password combinations or can extract security information e.g. access keys or credentials files from client applications.

Existing authentication systems, in the case of a human client using password-based authentication, have security issues due to limitations of 'simple' passwords, such as password complexity and password reuse. Simple passwords chosen by a human client are often of a low complexity, tend to be short in length, use characters from a limited character set, and use words and formats that are easier to find in comparison with 'complex' passwords, such as a random or pseudo-random password of a similar length. Such simple passwords provide lesser protection from various security attacks, such as brute forcing where an attacker tries multiple passwords, in comparison to complex passwords. Although complex passwords are more secure, using complex passwords is difficult to implement with human clients as complex passwords are more difficult to remember and use as compared to simple passwords. Additionally, human clients, as users generally need to remember and use a number of passwords, will often reuse the same password for multiple target systems meaning that a compromise of one target system can compromise another. In general, password reuse includes various types of credentials reuse. In a case where client credentials allow a user to access a target, the client credentials are the target credentials, and reuse and/or compromise of client credentials includes similar problems to password reuse. Different, unique passwords for every target system are more secure, but are much more difficult for a user to remember and implement.

An additional issue in conventional authentication methods is a lack of action-accountability in shared account or shared identity situations. Frequently, more than one user can access a target using the same target credentials. This is particularly true in the case of accounts representing a role on the target system, such as administrator, system, technician, application, etc. In these cases authentication to the system of more than one individual client or user is with a shared account, using the same target credentials, meaning actions performed on the system cannot be linked to a particular client or user. This is particularly problematic as these shared accounts are often also privileged accounts enabling performance of actions on the target system that require specific privileges.

As illustrated in FIG. 1B, the conventional introduction of a proxy for authentication of a client to a target means that the client connects to the proxy via a non-native protocol. In other words, instead of using a native-protocol as described in reference to FIG. 1A, the client of FIG. 1B must be changed to use a special, non-native protocol to communicate with the proxy (proxy application) providing the connection. This means that, upon introduction of a proxy to a system, the client needs to change, for example, scripts, procedures, applications, etc. in order to use the protocol of the proxy application.

Figure 4:
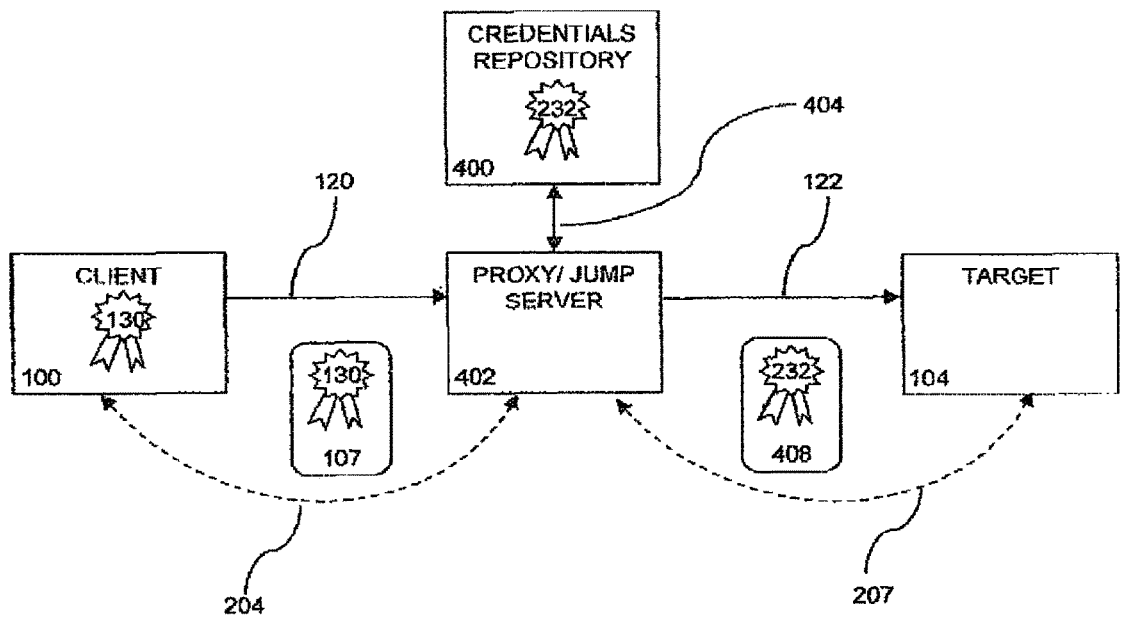
FIG. 4 is a schematic diagram of a conventional system of authentication including a proxy or jump server.

Refer now to FIG. 4, a schematic diagram of a conventional system of authentication including a proxy or jump server 402. An example of similar proxy or jump servers is the Privileged Session Manager® offered by CyberArk®. In this case, the proxy (or jump server) has access to a credentials repository 400 through a proxy-credentials repository link 404. In a typical case, when client 100 wants to access target 104, client 100 connects with proxy (jump server) 402 via a client-proxy link 120. Client-proxy link 120 is a terminal connection or browser-based connection and thus communication between client 100 and proxy 402 is via non-native protocol/s. Client 100 sends a first access request 107 that includes client credentials 130 via a non-native protocol. Once proxy 402 has verified client 100 based on client credentials 130, proxy 402 then receives target access credentials 232 from credentials repository 400 and sends a second access request 408 using a native protocol to target 104 via a target-proxy link 122. Second access request 408 includes target access credentials 232.

Target 104 receives second access request 408 and performs authentication using target access credentials 232. If target 104 successfully verifies target access credentials 232 and authentication is successful, target 104 authorizes second access request 108 and communications between client 100 and target 104 are established via proxy 402. Communications between client 100 and target 104 are via two links: a proxy-client non-native protocol logical communications link 204 and a proxy-target native protocol logical communications link 207.

In systems such as that of FIG. 4, as the client connects to the proxy via a terminal or browser link, the connection uses a special protocol of the jump server application on the proxy. In other words, the client proxy link 120 is a non-native protocol. Therefore, by introducing a proxy the client is then required to change the protocol by which the client requests access to the target. This creates an implementation challenge, since many users, especially privileged users such as administrators or operators, do not want to use a terminal or a browser to connect to target machines.

Although in some conventional systems of authentication including a proxy, such as that illustrated in FIG. 5, the client connects to the proxy using a native protocol, in such systems the target access credentials are supplied by the client and therefore are not secured.

Figure 2:
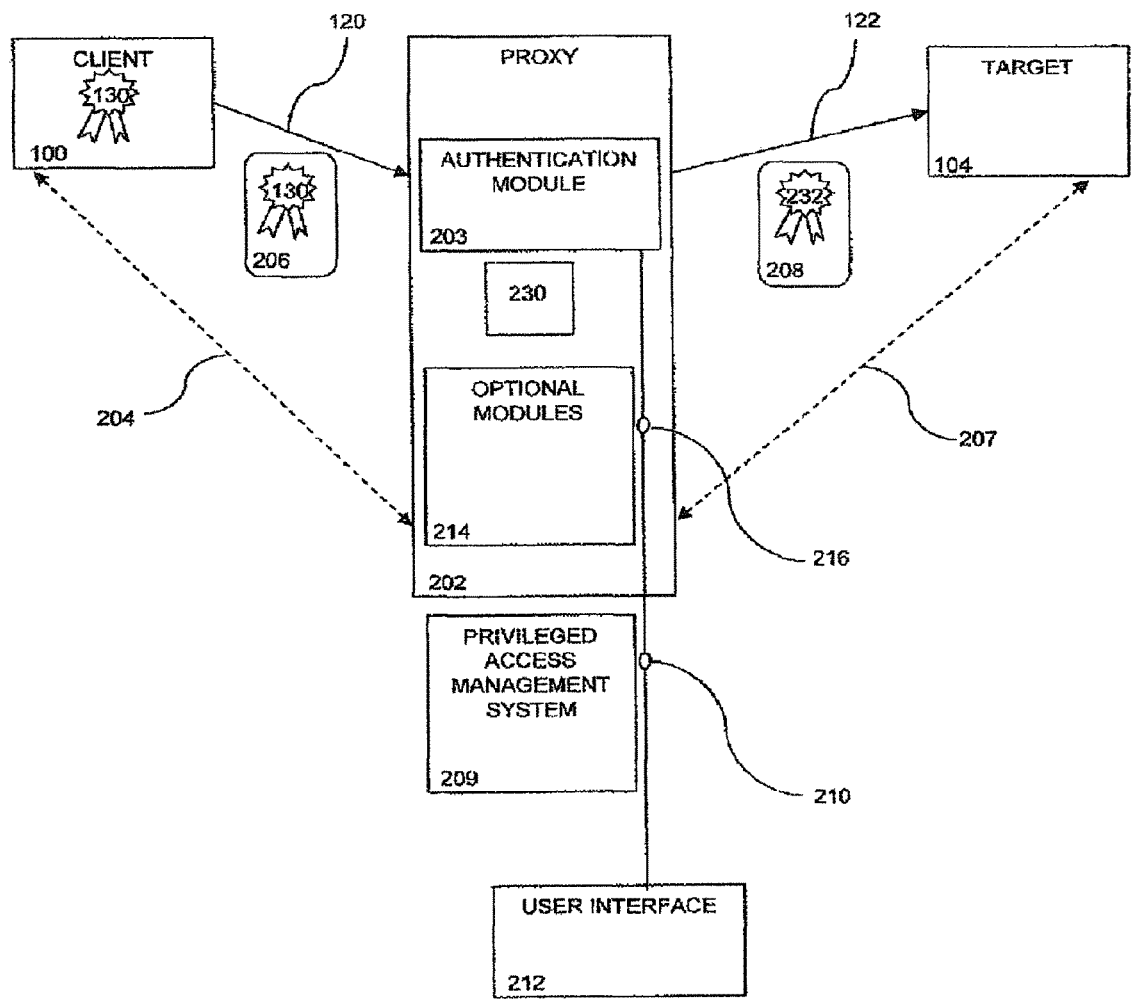
FIG. 2 is a schematic diagram of an exemplary implementation of an authentication system.

Referring again to the drawings, FIG. 2 is a schematic diagram of an exemplary implementation of an authentication system. In general, this embodiment involves a client 100, a proxy 202, and a target 104. Client 100 provides client credentials 130. When client 100 wants to access target 104, client 100 sends a first access request 206 via a native protocol to proxy 202. First access request 206 includes client credentials 130 and sufficient information for proxy 202 to be able to identify target 104. In some embodiments client credentials 130 can be inherent credentials, contained in the access request, for example client IP address. Proxy 202 includes an innovative authentication module 203 and target authentication information 230.

Authentication module 203 authenticates the client using client credentials 130 and provides, using target authentication information 230 and first access request 206, target access credentials 232. In one embodiment upon verifying client credentials 130 authentication module 203 provides target access credentials. Proxy 202 sends a second access request 208 via a native protocol to target 104. Second access request 208 includes target access credentials 232. Target 104 receives second access request 208 and performs authentication using target access credentials 232. If target 104 successfully verifies target access credentials 232 and authentication is successful, target 104 authorizes second access request 208 and communications between client 100 and target 104 are established via proxy 202. A feature of the current embodiment is that communications between client 100 and target 104 are via two links: a proxy-client native protocol logical communications link 204 and a proxy-target native protocol logical communications link 207. In one embodiment target credentials 232 are privileged account credentials, for example administrative or root account credentials. As client 100 is not authenticated directly to the target 104 and does not possess target credentials 232, communication between client 100 and target 104 including client communications originating from the client and target communications originating at the target must be through proxy 202. As a result, proxy 202 can have full knowledge of the communications between client 100 and target 104. Another significant feature of the current embodiment is that the client 100 can connect to the proxy 202 using the same (native) protocol the client originally used in a conventional implementation to connect to target 104. In other words, the client is not required to go through a terminal/browser or other "non-native" protocols to authenticate to a target.

For clarity in FIG. 2, client credentials 130 are shown on client 100 and target authentication information 230 is shown on proxy 202. In another embodiment, target authentication information 230 is a database able to provide target access credentials 232 based on an input, or two or more inputs including, but not restricted to, client credentials 130, first access request time, first access request date, client identity, user identity, target identity, etc. In another embodiment, target authentication information 230 is provided by an algorithm able to transform input's (e.g. client credentials 130) into target access credentials 232. Target authentication information 230 can be held by the proxy (as shown) or alternatively by the authentication module or by a PAMS. Typically, target access credentials 232 are provided based on communications features of 206.

Note that target authentication information 230 can be implemented in many forms, some typical examples of which are described above. In addition to target authentication information 230 being credentials, or being credentials provided by an algorithm, target authentication information 230 can be logic that is, target authentication information 230 is logic, the algorithm of which contains what is necessary to provide target access credentials 232 based on a first access request 206.

In an embodiment where PAMS 209 stores target access credentials 232 target authentication information 230 is a logic request which indicates to the PAMS what data to provide to target 204 as target credentials 232.

Target access credentials 232 can come from a privileged access management system (PAMS) 209. PAMS 209 uses first access request 206 and target authentication information 230 to provide target access credentials 232. In some embodiments, target access credentials 232 are stored in PAMS 209. In yet another embodiment, the authentication module 203 involves PAMS 209 both in authenticating the client using client credentials 130 and in providing target access credentials 232.

One skilled in the art will realize that credentials can be implemented in various forms, depending on the specific application. Depending on the form of credentials used, credentials may be stored on the client/proxy, provided by a user to the client/application as needed, or accessed from a machine other than the client/proxy. Based on this description, one skilled in the art will be able to design credential storage and provisioning for a specific application (implementation).

Although in the figures only one client and one target are illustrated for simplicity and clarity, one skilled in the art will realize that, typically, more than one client can concurrently or sequentially obtain access to one or more targets through one or more proxies. Interconnected systems including one or more than one client, one or more than one proxy, and one or more than one target are envisioned and encompassed by the invention.

Although, in the illustrated embodiments, the system involves a client accessing a target, one skilled in the art will realize that suitable applications of the invention include, but are not restricted to a client-server relationship where target 104 is a server.

In an embodiment where the client is an application residing on a client machine, client-proxy authentication can be by inherent client credentials such as connection time and network address.

In another embodiment, client 100, proxy 202 and target 104 are all part of a single organization infrastructure. Client 100, proxy 202, and target 104 can be in the same physical location or geographically separate. In another embodiment of the invention client 100 and target 104 can be part of different organizational structures, for example, a customer-provider relationship. If client 100 and target 104 are part of different organizational structures proxy 202 can be associated either with client 100 or alternatively with target 104.

In another embodiment, proxy 202 is in combination with a server, which can be a virtual or physical server, on which a proxy application resides. Alternatively, proxy 202 can be an application residing on the client machine or device or on another machine or device in the network.

It is important to note that the above-described embodiment of FIG. 2, unlike in the conventional proxy-based authentication systems exemplified in FIG. 1A, FIG. 1B and FIG. 5, client credentials 130 are other than target access credentials 232. Therefore, the client is not exposed to the target access credentials, as the target access credentials are provided at the proxy. This prevents target access credentials from residing in client/user space, a significant feature of the current embodiment. Thus, an attack on the client cannot reveal target access credentials providing access to the target. Furthermore, unlike the conventional authentication system of FIG. 4 connection of the client to the proxy is via native protocol/s. This makes the system easily implementable as clients can continue to use the same protocol to access the proxy as was previously used to access directly a target upon installation of the system.

Another feature of the current embodiment is that security issues associated with human clients, such as the above-described simple passwords, password reuse, etc. can be avoided. This is as target access credentials 232 are provided by authentication module 203. As target access credentials do not need to be remembered by a human, unique, complex passwords that can be updated frequently can be used. A further feature is allowing a user to establish a connection to a target using client credentials of a different type than that supported by the target; the client credentials can be a different credentials type than the target access credentials. For example, a user accesses client 100 using a prescribed form of authentication, such as a physical token. This authentication of the user to the client is the basis of client credentials 130. The user then initiates first access request 206. On proxy 202, authentication module 203 processes request 206 (including client credentials 130) in combination with authentication information 230 to generate second access request 208. In this example, target access credentials 232 can include credentials that are alternatives and/or stronger than the credentials used by the user on the client, such as a complex password or a single use password. Thus, for example, a user can effectively establish a connection to a target through a proxy by employing a physical token, when the target only supports a single-use password.

In some embodiments, as will be described below, shared/privileged accounts on a target can be accessed without divulging privileged target access credentials to users and issues associated with control and monitoring of shared or privileged accounts can be addressed. In addition, native protocols are used for all communication links, facilitating changes (such as the addition of valid credentials) on the protocol level, avoiding the need for creating a separate session. The use of native protocols allows an increased level of control over the content of client-target communications, as compared to conventional solutions.

In an optional embodiment of the invention, the system further includes a privileged access management system (PAMS) 209. Privileged Access Management Systems (PAMS) are a well-known solution for managing privileged accounts. These systems hold the credentials for privileged accounts and a mapping of users (usually administrators) to permitted accounts, according to a policy defined by the organization. The privileged access management system 209 connects to authentication module 203 at a privileged access management system input/output port 210 and can manage target authentication information 230, privileged, shared, and other sensitive account target access credentials 232 in an organizational infrastructure. Management by privileged access management system can include secure storage of credentials (including client credentials and/or target access credentials), management of credentials replacement, auditing, and other functions. An important aspect of PAMS is the support of various workflows, such as managerial approval for password retrieval, correlation with ticketing systems, password replacement and so on. These support organizational policy and procedures for network security and access control.

Target access credentials 232 can be securely stored in a privileged access management system secure storage 209. PAMSs are commercially available from a number of vendors. An example of a suitable secure storage is a PAMS solution by CyberArk® known as PIM/PSM suite, which employs Digital Vault solution as disclosed in U.S. Pat. No. 6,356,941. The privileged access management system manages target access credentials replacement, the changing or refreshing of target access credentials. This can be automated and involves changing target access credentials within the privileged access management system secure storage and communicating these new target access credentials to the target or targets. As mentioned previously, target access credentials replacement can be on a frequent basis, e.g. once a day. Although PAMS typically includes an internal user interface, privileged access management system input/output port 210 can alternatively connect to a user interface 212 (as illustrated). Both PAMS internal user interface and user interface 212 can provide external control to the privileged access management system database and settings.

Optionally, embodiments of the invention can include one or more optional modules 214 with corresponding optional module input/output port(s) 216. Optional module input/output port(s) 216 can connect to optional user interface 212, providing external control through the user interface to the functions of the optional modules. Optional module input/output port(s) 216 can connect to other elements of the system as necessary. One skilled in the art will realize that optional modules can be implemented as part of other elements of the system, for example as part of the privileged access management system, or implemented standalone. For simplicity in the current description, a distinction is generally not made, for example, if a monitoring module is stand-alone or part of the privileged access management system.

In an optional embodiment, optional modules 214 includes a usage policy module that can implement a usage policy. For example, the usage policy module can specify which clients have access to which targets, allowed access times, and/or dates for each client-target pair, and communication settings e.g. allowed protocols for each client-target pair etc. Access times can be categorized by an access request time that can be the time of sending or receiving a first or second access request.

In another embodiment, optional module 214 includes a database that contains necessary information for the aforementioned features, including for each client-target pair such information as: if access is allowed, allowed times/dates, and allowed protocols.

In other optional and/or additional embodiments, the optional modules 214 can provide features including filtering, action control, monitoring, analysis, recording, attribution, interference, and termination.

In an optional embodiment, optional modules 214 includes a filtering module. The filtering module filters communications to and from the target system.

The filtering module can implement a variety of control depending on the specific application. Implementations of a filtering module include, but are not restricted to access or action control; limiting access to a target and limit or control of actions performed on the target. Since all client communications and all target communications go through the proxy, the proxy is able to interfere with all communications, including commands that are sent from the client to the target. The filtering module can correlate client communications with a preconfigured policy for the specific account being used and enforce action limits. Methods of filtering or interfering with client commands in accordance with a predefined list are known in the art.

A suitable filtering or interference method is white-listing or blacklisting specific commands. White listing refers to enabling specific commands on a target according to a preset white list, blacklisting refers to preventing specific commands on a target according to a preset black-list. More complex filtering is also implementable such as permitting specific commands only at specific times, and/or only from specific originating IP addresses (clients), and/or only in a specific order, and/or only to specific targets, and/or only between specific client-target pairs etc. Such complex filtering is thus by communication time, and/or a client identity and/or a target identity, and/or a communication history where a communication history is a historic sequence of communications for a given time duration or number of communications or number of commands.

Target communications (communication or output from a target) can also be filtered according to a predefined policy as is known in the art. For example, it is possible to delete specific data for example, the output of specific commands. It is possible to mask specific data, preventing the client from viewing/having access to the specific data, for example, internal IP addresses. It is possible to replace specific data. Such deleting, masking, and replacing actions can each be according to a preset list, a deletion list, a masking list, and a replacement list.

When the client has the credentials for multiple targets, monitoring and analysis of client communications in conventional authentication systems becomes challenging, since multiple monitoring agents must be installed on all targets or all clients. The introduction of proxy 202 addresses this challenge as proxy 202 provides a central point on which monitoring can be successfully performed. In one embodiment, optional modules 214 includes a monitoring module that facilitates proxy-based monitoring of communications between the client 100 and the target 104. Basic monitoring may include storing all communications between the client and the proxy and between the proxy and the target. Another form of monitoring is to store the communication content, for example the actual commands being sent in these communications. Monitoring can be automatic when communications between a client and a target are initiated. Monitoring can include analyzing certain communications resulting in the monitoring module producing a monitoring signal. For example, a database of possible communications can be associated with the monitoring module, and monitoring can be implemented at least in part by comparing client-target communication against this database. A monitoring signal can be produced according to the database or data list. The monitoring signal can be used for logging activity, or notifying one or more entities, in particular initiating an alarm or alert to notifying a system administrator or other entity upon detection of suspicious or non-permitted activity. For example, when a user or client attempts to connect to a target outside of an allowed access window, repeated attempts from a client to connect to a target, or requests from unauthorized users to access a particular target.

In one embodiment, the monitoring module inspects client communications and target communications using a rule based method where specific actions that are deemed sensitive or potentially dangerous by the organization are described in a predefined behavior policy and the monitoring module initiates an alert or alert signal when a communication matches a rule.

In another embodiment, the monitoring module inspects client-target and target-client communications using a statistical based method where the monitoring module learns normal behavior patterns and detects anomalies or deviations from normal behavior.

Alternatively, monitoring can be manual where a human views the communications through user interface 212 or in an embodiment where client communications and/or target communications are replicated to a separate server for viewing and analysis.

Optional modules 214 can include a control module. The control module can modify communications and terminate the connection between the client and the target system. The term 'modify' in this context refers to the content of the communication being altered. This can also be termed 'replacement' or 'replacing' because the original communication is replaced by a modified version. Control can be automatic, where set situations or commands result in a particular interference. Control can also be manual, where a human monitoring the communications through the user interface can respond by modifying a communication or terminating the connection between the client and target.

Optional modules 214 can include a recording module which can record or log to a recording storage (not shown) various features of (information regarding) communications between the client and target. Recordable communications features include information such as the content of the communication, the client identity, the target identity, the user identity, the communication time and date, the communication protocol etc. One or more recordable features can be recorded together for ease of data retrieval. The recording module can provide audit information, facilitating auditing of communications where a user accesses the recording storage through a user interface, auditing part or all of the contents. Monitoring, as described above, can also be employed in recording where the system can monitor in order to define or decide which communications or features of communications should be recorded.

As the proxy is aware of which client is accessing which target and the content of the communications between the client and the target via the proxy, in one embodiment the authentication module and/or optional modules such as monitoring module, control module, or PAMS can provide attribution, where communications with (and particularly commands to) a target can be linked to a particular client. This is particularly useful as conventional systems have difficulty in attribution to a particular client or user on shared identity accounts.

In embodiments were attribution is achieved by integration with PAMS 209, PAMS 209 can provide user authentication and target credentials, as described above. In such embodiment, PAMS holds the records regarding which user accessed which target with what credentials, records that are needed for attribution.

The proxy authentication module and privileged access management system module can both be implemented in hardware, firmware, software, or any combination thereof. The privileged access management system can be implemented as a stand-alone module in communication with the authentication module, or implemented as a sub-module in the authentication module.

A method of authentication includes the steps of receiving at a proxy an access request via a protocol. The access request includes client credentials associated with a user. After the proxy receives the access request, the proxy provides target access credentials for authenticating the user. Providing the target access credentials is based on the client credentials and target authentication information. The provided target access credentials are then sent by the proxy via the same protocol to a target. A significant feature of this embodiment is that the target access credentials provided by the proxy are other than the client credentials.

Figure 3:
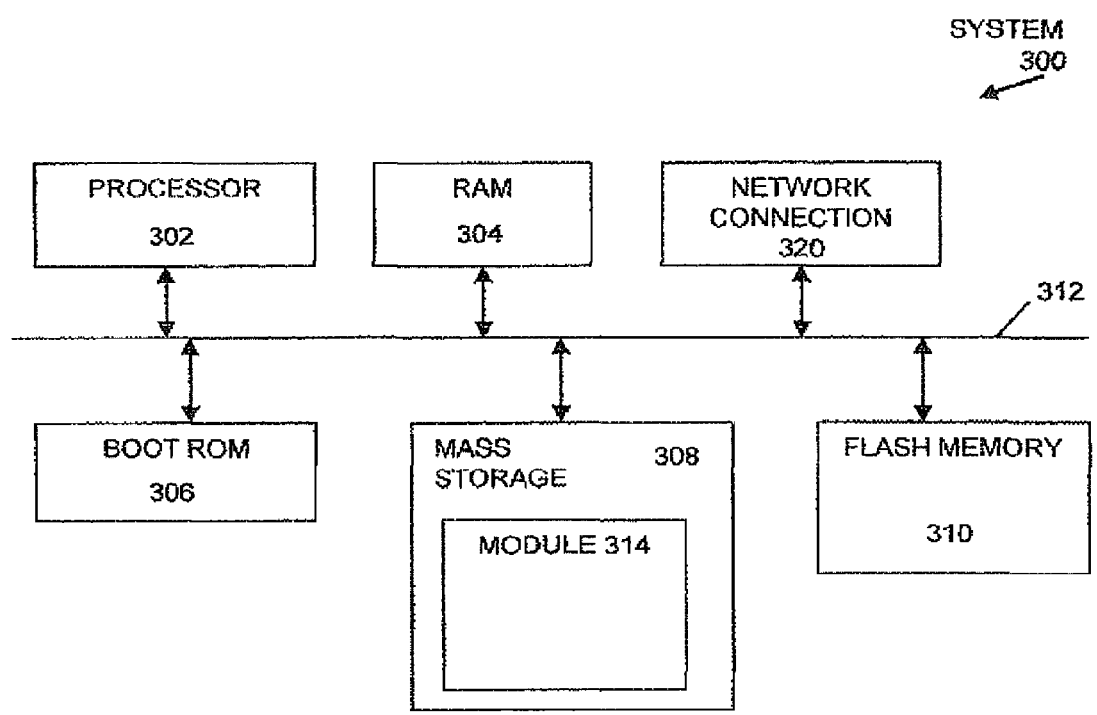
FIG. 3 is a high-level partial block diagram of an exemplary system configured to implement proxy of the present invention.

FIG. 3 is a high-level partial block diagram of an exemplary system 300 configured to implement proxy 202 of the present invention. System (processing system) 300 includes a processor 302 (one or more) and four exemplary memory devices: a RAM 304, a boot ROM 306, a mass storage device (hard disk) 308, and a flash memory 310, all communicating via a common bus 312. A module (processing module) 314 is shown on mass storage 308, but as will be obvious to one skilled in the art, could be located on any of the memory devices.

Mass storage device 308 is a non-limiting example of a computer-readable storage medium bearing computer-readable code for implementing the authentication methodology described herein. Other examples of such computer-readable storage media include read-only memories such as CDs bearing such code.

System 300 may have an operating system stored on the memory devices, the ROM may include boot code for the system, and the processor may be configured for executing the boot code to load the operating system to RAM 304, executing the operating system to copy computer-readable code to RAM 304 and execute the code.

Network connection 320 provides communications to and from system 300. Typically, a single network connection provides one or more links, including virtual connections, to other devices on local and/or remote networks. Alternatively, network connection 320 can provide system 300 with more than one network connection (not shown), each network connection providing one or more links to other devices and/or networks.

For clarity, non-limiting examples of operation of the current embodiment are now described: In a first non-limiting example, the client is an application and needs to connect to a target database. The application connects to the proxy, sending a first access request via a native protocol connection e.g. by using SQL (Structured Query Language), which includes the application's credentials. An authentication module on the proxy authenticates the application by using the application's credentials, connection time, and the network address from which the request originated. The proxy then establishes a target-proxy link via the native protocol connection e.g. by using SQL, to the target database on the target. The authentication module injects the correct target access credentials into the first access request to create a second access request. The second access request is transmitted via the target-proxy link to the target that authenticates the second access request using the target access credentials, and if positive, authorizes access to the target database. These sensitive target access credentials are not divulged to the client application and do not reach a machine on which the application resides. Thus, for example, preventing an attacker that has breached the client machine from extracting and abusing the sensitive target access credentials. All communications and actions between the client application and the target system are monitored by the privileged access management system (for example for an integrated or stand-alone monitoring module) and can be attributed to the specific application.

In a second non-limiting example, a user that is a system administrator wants to establish a connection using a "root" account to a target UNIX machine. From the system administrator's personal computer, acting as the client, the system administrator establishes a native protocol connection (such as SSH) to the proxy system. The system administrator initiates a first access request to authenticate to the proxy with a personal user identifier. The proxy system via the authentication module verifies that the system administrator has access rights to the target UNIX machine. The proxy system (authentication module) then generates a second access request to the target. The proxy establishes a connection to the target system. The "root" account target access credentials are not divulged to the user, in this case, the system administrator, and never reach the client machine. All actions are also monitored and can be attributed to the specific user. In a case where multiple people are acting as a system administrator for the target, the current embodiment allows multiple users to be authenticated at the proxy, none of the users having access credentials for the target, and tracking the access and activity (communications) of each user.

In a third non-limiting example, a user requires connection to a target system that only accepts a username/password combination as valid target access credentials. However, the user prefers (or is required by organizational regulations, or in order to enforce new, stronger authentication methods such as biometrics for control access to older target systems which do not support such methods by themselves) to use a different method of authentication, such as biometric identifier, gesture, selecting an image, physical token, certificates, machine or device identifier, application identifier etc. The invention can support this scenario by the user authenticating to the proxy system using the preferred method of authentication thus establishing a connection to the proxy. The proxy system then generates a second access request including the required target access credentials, establishing a connection to the target system.

The choices used to assist in the description of this embodiment should not detract from the validity and utility of the invention. It is foreseen that more general choices including, but not limited to, materials and polarizations can be used, depending on the application.

The use of simplified calculations to assist in the description of this embodiment should not detract from the utility and basic advantages of the invention.

Note that a variety of implementations for modules and processing are possible, depending on the application. Modules are preferably implemented in software, but can also be implemented in hardware and firmware, on a single processor or distributed processors, at one or more locations.

The above-described module functions can be combined and implemented as fewer modules or separated into sub-functions and implemented as a larger number of modules. Based on the above description, one skilled in the art will be able to design an implementation for a specific application.

To the extent that the appended claims have been drafted without multiple dependencies, this has been done only to accommodate formal requirements in jurisdictions that do not allow such multiple dependencies. It should be noted that all possible combinations of features that would be implied by rendering the claims multiply dependent are explicitly envisaged and should be considered part of the invention.

It should be noted that the above-described examples, numbers used, and exemplary calculations are to assist in the description of this embodiment. Inadvertent typographical and mathematical errors do not detract from the utility and basic advantages of the invention.

It will be appreciated that the above descriptions are intended only to serve as examples, and that many other embodiments are possible within the scope of the present invention as defined in the appended claims.

What is claimed is:

1. A proxy system comprising:
at least one processor configured to:
    receive from a client, via a native protocol, a first access request requesting access by the client to a target application;
    determine target application access credentials based at least in part on the first access request and a policy enforced by the proxy system, wherein the target application access credentials are effective to authenticate the proxy system to the target application;
    provide to the target application a second access request requesting access to the target application, wherein the second access request comprises the target application access credentials; and
    responsive to the proxy system being authenticated to the target application based on the target application access credentials, establish access for the client to the target application through the proxy system and via the native protocol, wherein the access is consistent with the policy and is established based on the target application access credentials, and the client is not exposed to the target application access credentials.

2. The proxy system of claim 1, wherein the first access request comprises client access credentials associated with a user, and the client access credentials comprise a communication feature associated with the first access request.

3. The proxy system of claim 1, wherein providing the second access request comprises providing the second access request via the native protocol.

4. The proxy system of claim 1, wherein:
the first access request comprises a plurality of communication features; and
determining the target application access credentials comprises determining the target application access credentials based on at least some of the plurality of communication features.

5. The proxy system of claim 4, wherein determining the target application access credentials based on at least some of the plurality of communication features comprises identifying the target application access credentials in a database based on at least some of the plurality of communication features.

6. The proxy system of claim 4, wherein determining the target application access credentials based on at least some of the plurality of communication features comprises transforming at least some of the plurality of communication features according to an algorithm to produce the target application access credentials.

7. The proxy system of claim 1, wherein establishing access for the client to the target application comprises establishing a first logical communication link between the client and the proxy system and establishing a second logical communication link between the proxy system and the target application.

8. The proxy system of claim 1, wherein the proxy system comprises a privileged access management system.

9. The proxy system of claim 1, wherein the at least one processor is further configured to monitor the access to the target application through the proxy system.

10. The proxy system of claim 9, wherein the at least one processor is further configured to:
based on the monitoring, detect suspicious activity; and
in response to detecting suspicious activity, issue an alert.

11. A non-transitory computer readable medium including instructions that, when executed by at least one processor of a proxy system, cause the at least one processor to perform operations comprising:
receiving from a client, via a native protocol, a first access request requesting access by the client to a target application;
determining target application access credentials based at least in part on the first access request and a policy enforced by the proxy system, wherein the target application access credentials are effective to authenticate the proxy system to the target application;
providing to the target application a second access request requesting access to the target application, wherein the second access request comprises the target application access credentials; and
responsive to the proxy system being authenticated to the target application based on the target application access credentials, establishing access for the client to the target application via the native protocol, wherein the access is consistent with the policy and is established based on the target application access credentials, and the client is not exposed to the target application access credentials.

12. The non-transitory computer readable medium of claim 11, wherein providing the second access request comprises providing the second access request via the native protocol.

13. The non-transitory computer readable medium of claim 11, wherein:
the first access request comprises a plurality of communication features; and
determining the target application access credentials comprises determining the target application access credentials based on at least some of the plurality of communication features.

14. The non-transitory computer readable medium of claim 13, wherein determining the target application access credentials based on at least some of the plurality of communication features comprises identifying the target application access credentials in a database based on at least some of the plurality of communication features.

15. The non-transitory computer readable medium of claim 13, wherein determining the target application access credentials based on at least some of the plurality of communication features comprises transforming at least some of the plurality of communication features according to an algorithm to produce the target application access credentials.

16. The non-transitory computer readable medium of claim 13, wherein the plurality of communication features comprise one or more of a content of the first access request; an access request time of the first access request; an identity of the client; an identity of the target application; and the native protocol.

17. The non-transitory computer readable medium of claim 11, wherein establishing access for the client to the target application comprises establishing a first logical communication link between the client and the proxy system and establishing a second logical communication link between the proxy system and the target application.

18. The non-transitory computer readable medium of claim 11, wherein the operations further comprise monitoring the access to the target application.

19. The non-transitory computer readable medium of claim 18, wherein the operations further comprise:
based on the monitoring, detecting suspicious activity; and
in response to detecting suspicious activity, issuing an alert.

20. The non-transitory computer readable medium of claim 19, wherein the operations further comprise, further in response to detecting suspicious activity, terminating the access to the target application.

21. A computer-implemented method comprising:
receiving from a client, by a proxy system via a native protocol, a first access request requesting access by the client to a target application;
determining target application access credentials based at least in part on the first access request and a policy enforced by the proxy system, wherein the target application access credentials are effective to authenticate the proxy system to the target application;
providing to the target application a second access request requesting access to the target application, wherein the second access request comprises the target application access credentials; and
responsive to the proxy system being authenticated to the target application based on the target application access credentials, establishing access for the client to the target application via the native protocol, wherein the access is consistent with the policy and is established based on the target application access credentials, and the client is not exposed to the target application access credentials.

22. The computer-implemented method of claim 21, wherein providing the second access request comprises providing the second access request via the native protocol.

23. The computer-implemented method of claim 21, wherein:
the first access request comprises a plurality of communication features; and
determining the target application access credentials comprises determining the target application access credentials based on at least some of the plurality of communication features.

24. The computer-implemented method of claim 23, wherein determining the target application access credentials based on at least some of the plurality of communication features comprises identifying the target application access credentials in a database based on at least some of the plurality of communication features.

25. The computer-implemented method of claim 23, wherein determining the target application access credentials based on at least some of the plurality of communication features comprises transforming at least some of the plurality of communication features according to an algorithm to produce the target application access credentials.

* * * * *